Figure 1A:
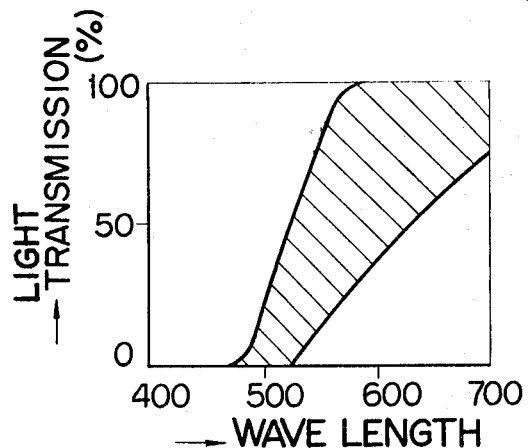

ns patent [11] 3,619,695

[72] Inventors Naoyoshi Nameda;
Tetsuhiro Kano, both of Yokohama-shi, Japan
[21] Appl. No. 804,632
[22] Filed Mar. 5, 1969
[45] Patented Nov. 9, 1971
[73] Assignee Tokyo Shibarua Electric Co., Ltd. Kawasaki-shi, Japan
[32] Priority Mar. 9, 1968
[33] Japan
[31] 43/15156

[54] FOG LAMP
4 Claims, 22 Drawing Figs.
[52] U.S. Cl. ................................................. 313/112, 313/110, 313/113, 350/311
[51] Int. Cl. ....................................................... H01j 5/16, H01k 1/22
[50] Field of Search ........................................... 313/110, 111, 112, 113; 350/1, 311

[56] References Cited
UNITED STATES PATENTS

| | | | |
|---|---|---|---|
| 2,290,186 | 7/1942 | Holman et al. | 313/112 X |
| 3,024,381 | 3/1962 | Dalton et al. | 313/112 |
| 3,174,067 | 3/1965 | Bahrs | 313/112 X |
| 3,188,513 | 6/1965 | Hansler | 313/112 |
| 3,320,460 | 5/1967 | Bouchard et al. | 313/112 |

*Primary Examiner*—John Kominski
*Assistant Examiner*—E. R. LaRoche
*Attorney*—George B. Oujevolk

ABSTRACT: A fog lamp comprises an envelope and light source therein. Inside the transmissible part of the envelope is attached a vacuum depositing color-rendering film consisting of cadmium sulfide, cadmium selenide and inorganic material such as germanium and/or silicon.

PATENTED NOV 9 1971 3,619,695

SHEET 3 OF 5

Naoyoshi Nameda
Tetsuhiro Kano
INVENTORS

BY George B. Oujevolk
Attorney

FOG LAMP

The present invention relates to a fog lamp for radiating colored light beams.

The colored lamp has various applications and is manufactured by many different methods. With respect to a sealed beam fog lamp, namely, a lamp for use in the fogs, colored beams are produced by the following three processes. The first process consists in coating the outer surface of the light-transmissible part or front lens of a lamp with an organic or inorgainic brown colorant using an organic binder. The second process resides in forming the light transmissible part itself from colored glass. The third is to apply color staining to the outer surface of the light-transmissible part.

However, these processes are handicapped by drawbacks as described below. With the first process, the coated film of an organic or inorganic colorant is liable to come off. While, in this case, it may be contemplated to apply such coating on the inner surface of the light-transmissible part of the lamp, this means causes an organic binder to be discolored, failing to obtain a desired color. The second process leads to wide variations in the manufacture of colored glass as well as in the fabrication of a light-transmissible part from such glass, failing to produce colored beams having uniform properties. The third process involves complicated operation steps and moreover causes spotted coloring to be generated, so that it is not deemed as practically useful.

The present invention provides a fog lamp which is formed by first selecting such kinds of coating materials as will present no difficulties in application on the inner surface of an electric lamp in order to eliminate the aforementioned shortcomings encountered with the lamps prepared by the conventional processes and then mounting such material by vacuum deposition on said inner surface. The aforementioned coating materials consist of cadmium sulfide, cadmium selenide and inorganic materials having a prescribed transmission to spectral light beams such as germanium or silicon.

Figure 1B:
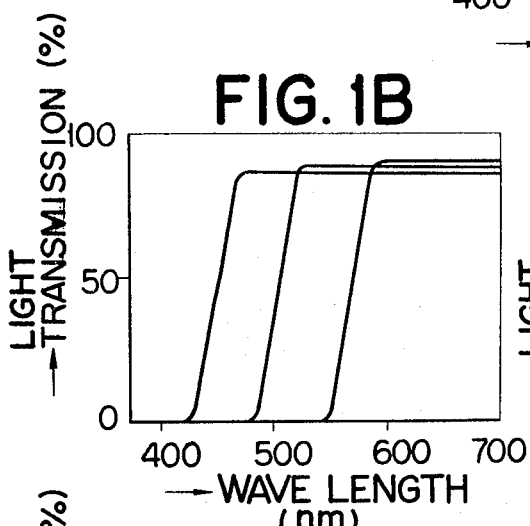
Figure 2:
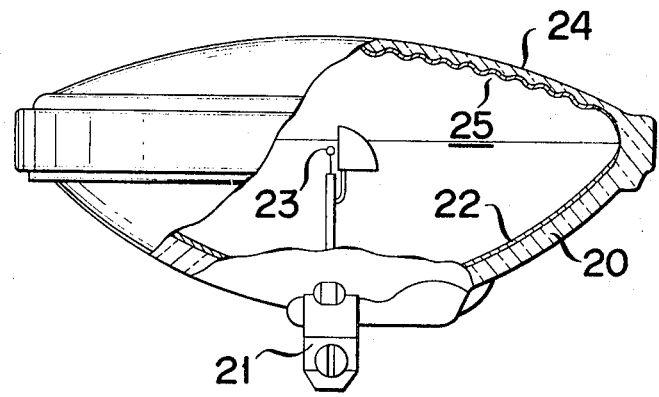
Figure 3A:
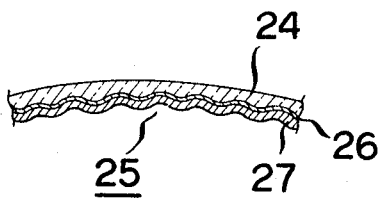
Figure 3B:
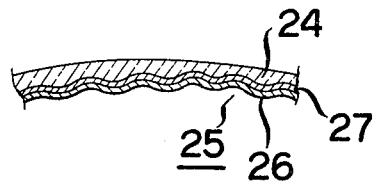
Figure 3C:
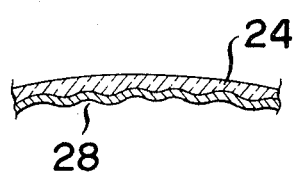
Figure 4:
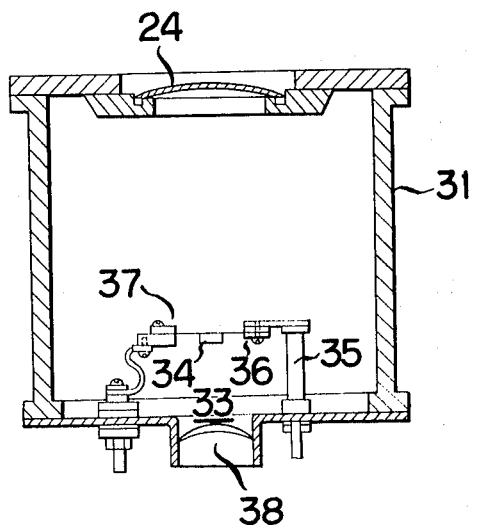
Figure 5A:
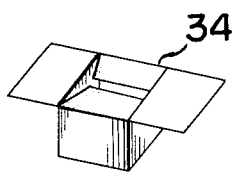
Figure 5C:
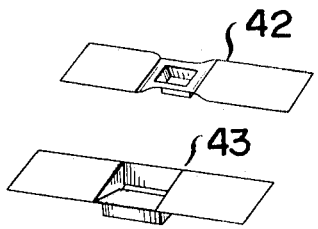
Figure 5B:
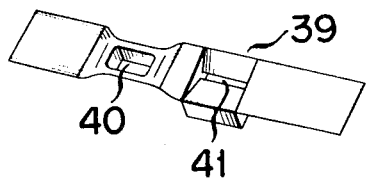
Figure 6A:
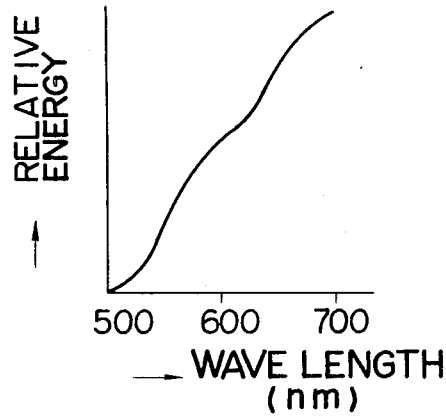
Figure 6B:
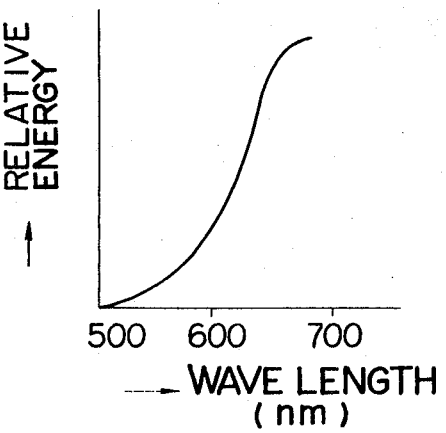
Figure 6C:
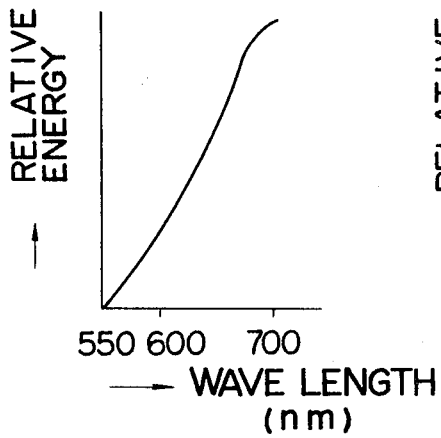
Figure 7:
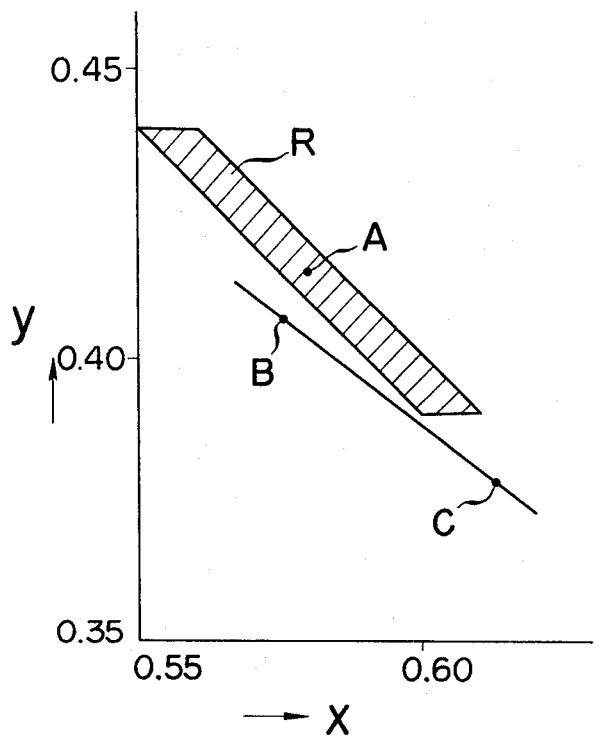
Figure 8D:
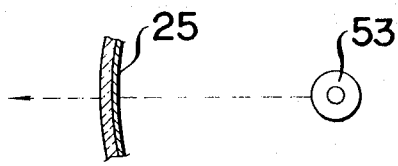
Figure 8A:
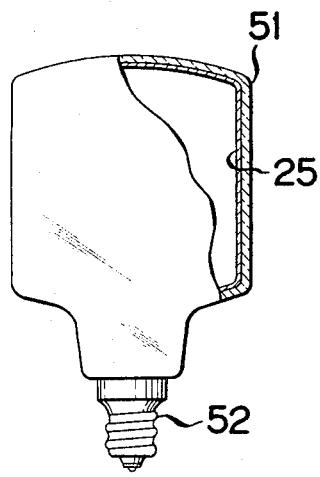
Figure 8B:
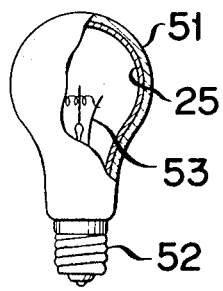
Figure 8C:
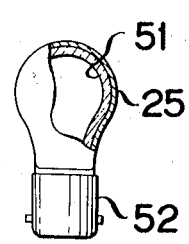

The invention is now described in conjunction with a preferred embodiment with reference to the accompanying drawings, in which:

FIGS. 1A to 1E are curve diagrams of light-transmitting property with the transmission represented by the ordinate and the wavelength by the abscissa; FIG. 1A denotes the range of the specification defined by SAE (SOCIETY OF AUTOMOTIVE ENGINEERS), FIG. 1B represents the light-transmitting property of a mixture of cadmium sulfide and cadmium selenide, FIG. 1C the light-transmitting property of germanium, FIG. 1D the range of light-transmitting property allowable for application of said mixture, and FIG. 1E the range of light-transmitting property allowable for application of germanium;

FIG. 2 is an elevation, with part broken away, of a fog lamp according to an embodiment of the present invention;

FIG. 3A presents the main part of said fog lamp and FIGS. 3B and 3C the main parts of modifications of said lamp which are sectional views;

FIG. 4 is a sectional view of a vacuum deposition apparatus used in fabricating a colored lamp of the present invention;

FIGS. 5A to 5C are perspective views of vessels for receiving materials to be vacuum deposited using said vacuum deposition apparatus; FIG. 5A is a vessel for folding a mixture of germanium, cadmium sulfide and cadmium selenide, FIG. 5B is a vessel for separately receiving germanium and a mixture of cadmium sulfide and cadmium selenide and FIG. 5C represents a pair of vessels intended for the same purpose as that of FIG. 5B, but completely separated;

FIGS. 6A to 6D are curve diagrams indicating the relative energies of light beams from lamps; FIG. 6A represents a lamp of the present invention whose light-transmissible part is coated with a thin film consisting of germanium, cadmium sulfide and cadmium selenide; FIGS. 6B and 6C denote lamps whose light-transmissible part is coated with a thin film consisting of cadmium sulfide and cadmium selenide, and FIG. 6D an electric lamp whose light-transmissible part is not coated with any color-rendering film;

FIG. 7 shows a standard chromaticity diagram prepared by CIE (Commission Internationale de l'Eclairage), a hatching defined by a curve R denoting the range of the specification stipulated by SAE;

FIGS. 8A to 8C are elevations, with part broken away, of different kinds of colored lamps according to the present invention; FIG. 8A is a decorative lamp, FIG. 8B an incandescent lamp for general household use and FIG. 8C is a midget lamp for automobiles; and FIG. 8D is a schematic illustration of a filter bearing a thin color-rendering film and source of light used in a further modification of the present invention.

Figure 1C:
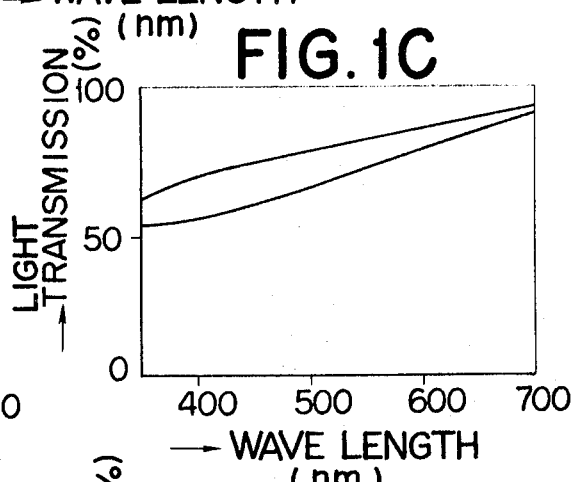
Figure 1D:
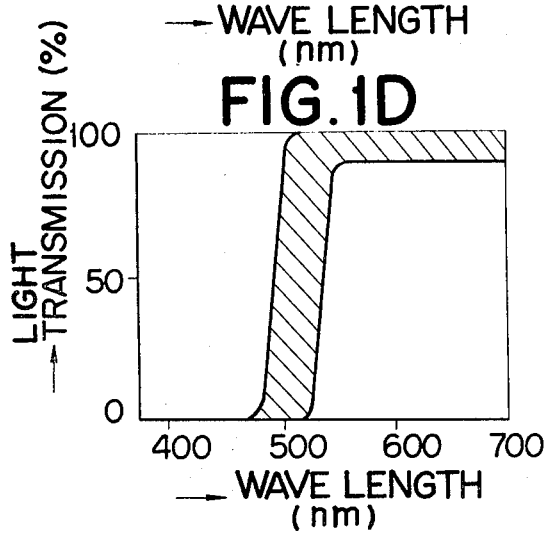
Figure 1E:
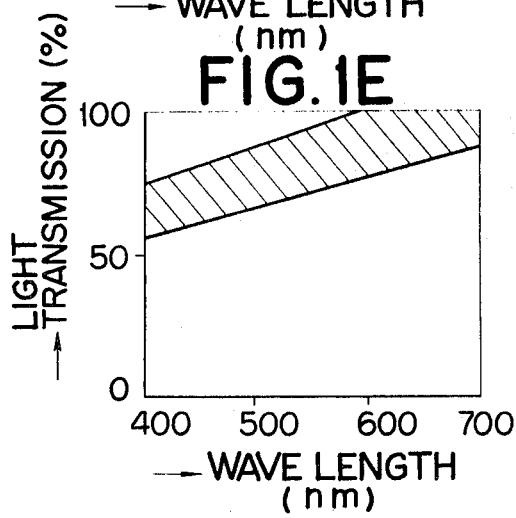

There will now be described the process whereby the color-rendering materials of the present invention for an electric lamp were devised. FIGS. 1A to 1E show the spectrotransmission. In FIG. 1A, the hatching defined by two curves denotes the range of the specification stipulated by SAE with respect to a fog lamp, namely, lamp for use in the fogs. FIG. 1B presents a group of curves representing the spectrotransmission displayed by a thin color-rendering film consisting of cadmium sulfide for a yellow color and cadmium selenide for a red color. Where relatively large amounts of cadmium sulfide are contained or where the film has a small thickness, said curve is shifted toward the region of short wavelengths. As clearly seen from the figure, this color-rendering film formed of cadmium sulfide and cadmium selinide has such spectrotransmission as is represented by sharp rising curves, so that no matter how the proportions of cadmium sulfide and cadmium selenide are varied, the film does not meet the SAE specification for a fog lamp. Accordingly, the inventors added various proportions of inorganic materials to cadmium sulfide and cadmium selenide in an attempt to find a composition to meet the SAE specification. As a result, it has been found that the most suitable inorganic material is one which, as shown in FIG. 10, has a spectrotransmitting property which may be indicated by a curve gently rising toward the long wave region. It has also been disclosed that many kinds of semiconductor materials such as silicon or germanium possess such property. The curve of FIG. 1C agrees with a curve representing the spectrotransmission displayed by a thin film of germanium, said transmission accounting for 70 percent for a wavelength of 400 nm. and 90 percent for a wavelength of 700 nm. Although it was realized that employment of the aforementioned three inorganic materials, namely, cadmium sulfide, cadmium selenide and germanium could well serve the purpose, it was still impossible in the case of a fog lamp to meet the SAE specification, unless the proportions of these inorganic materials were properly controlled. Accordingly attempts were made to define such proportions. As a result, it has been found that in case the third component consists of germanium, two to 50 parts by weight of cadmium selenide and 30 to 200 parts by weight of cadmium sulfide for one part by weight of germanium offer a range of composition capable of displaying good color rendition. Alternatively, to obtain a desired amber color, the required composition is Ge:CdSe:CdS =(1):(1 to 80):(20 to 400). In case silicon is used as a third component, the composition of Si:CdSe:Cds =(1):(2 to 200):(30 to 600) is suitable to produce said amber color. Expressed by curves of transmission the aforementioned range of proportions will be as shown in FIGS. 1D and 1E. Namely, FIG. 1D shows that among the mixtures of cadmium sulfide and cadmium selenide, those whose transmission falls within the range denoted by the hatching can be preferably used in the present invention, and FIG. 1E presents the range transmission of germanium available for use in the invention.

The reason why the aforesaid third component has been selected from the group of inorganic materials is that when coated on the inner surface of the light-transmissible part of an electric lamp, such inorganic material can be fully prevented from falling off therefrom, whereas organic materials, coated on said inner surface, are subject to discolorment or chemical deformation, and cause unnecessary gases to be evolved, prominently degrading the properties of the lamp.

Further, the present invention uses the vacuum deposition process in coating the inorganic third component on the inner surface of an electric lamp. This is intended to allow the particles of said inorganic third component to be distributed in good arrangement. By the term "good arrangement" is meant such distribution of the particles as will allow the light fluxes from the light source to be uniformly reflected on each of the particles.

There will now be described a sealed beam fog lamp according to an embodiment of the present invention by reference to FIG. 2 and FIGS. 3A to 3C. At the center of the back end of a cup-shaped vessel 20 open at the front and formed of borosilicate glass is disposed a metal part 21 for fitting the lamp to an object, for example, an automobile. On the inner surface of the sidewall of the vessel 20, namely, the rotatable paraboloid thereof is mounted a reflective film or layer 22, for example, a vacuum-deposited aluminum layer. At the center of the vessel 20 is positioned a filament 23 used as a light source. To the front open part of the vessel 20 is fused a front lens 24 made of hard glass in a manner to close up said open part. This lens 24 has a property of distributing the intensities of light beams in a unique way, and its inner surface, namely, its side facing the filament 23 is coated with a color-rendering film 25 as described below.

The color-rendering film 25 consists of cadmium sulfide, cadmium selenide and germanium formed in the following manner. As shown in FIG. 3A, there is vacuum deposited a layer 26 of a mixture of cadmium sulfide and cadmium selenide on one side of the lens 24 and on said layer is similarly vacuum deposited a layer 27 of germanium. Thus is prepared the color-rendering film 25. It is also possible to form, as shown in FIG. 3B, the germanium layer 27 first and mount thereon the layer 26 of a mixture of cadmium sulfide and cadmium selenide. Further, as shown in FIG. 3C, there may be vacuum-deposited germanium, cadmium sulfide and cadmium selenide mixed in advance to form a composite color-rendering film 28 at once. Germanium may be replaced by silicon or other inorganic materials having the range of light transmission as shown in FIG. 1C. Where germanium is used as a third component, the ratio by weight of the three constituents, i.e., Ge, CdS and CdSe, is (1):(30 to 200):(2 to 50) and in case silicon is added in place of germanium, the ration is Si:CdS:CdSe =(1):(30 to 600):(2 to 200).

There will now be described by reference to FIGS. 4 and 5 the method of producing a colored lamp, particularly the process of preparing the aforementioned color-rendering film 25.

In the opening at the center of the top wall of a bell jar 31 is disposed the lens 24, on which is vacuum deposited said color-rendering film 25, in a manner to close up said opening. Right below the lens 24 and in the bell jar 31 is positioned a source of materials to be vacuum deposited, namely, cadmium sulfide, cadmium selenide and germanium and a means 33 for heating said source. While the heating means 33 and source of vacuum-deposited materials may be arranged in various ways, they are in the case of FIG. 4 set in place in the following manner.

Germanium, cadmium sulfide and cadmium selenide are well mixed and hardened to form pellets. These pellets are placed at the bottom of a box-type vessel 34 made of tantalum as illustrated in FIG. 5A. The upper opening of the vessel is fitted with flanges to prevent the pellets from being scattered away. The vessel 34 containing the pellets is supported, as shown in FIG. 4, by a heating means 33 concurrently acting as a holder. This heating and holding means 33 comprises a support column 35 containing a lead line, a clamping device 36 formed of two metal plates projecting outwardly of the support column 35 and connected to the lead line and another clamping device 37 electrically connected to another lead line. The container 34 held by a pair of such clamping devices 36 and 37 is made to generate heat by itself when the lead lines are conducted.

When thus arranged, the bell jar 31 is evacuated through a vent 38, and the source of vacuum-deposited materials is heated by the aforesaid heating means 33 to form a color-rendering film consisting of a mixture of germanium, cadmium sulfide and cadmium selenide on one side of the lens 24.

Alternatively, there may be used another type of vessel 39 as shown in FIG. 5B which is made of the same material as the first mentioned vessel 34. The vessel 39 of FIG. 5B has two receptacles 40 and 41, one, 40, of which is used in holding germanium and the other, 41, one, 40, of which is used in holding germanium and the other, 41, of which in receiving a mixture of cadmium sulfide and cadmium selenide.

Where it is desired to prepare, as shown in FIG. 3B, two separate layers, one consisting of germanium and the other a mixture of cadmium sulfide and cadmium selenide, there are used a pair of vessels 42 and 43 as illustrated in FIG. 5C, one vessel 42 receiving germanium and the other 43 a mixture of cadmium sulfide and cadmium selenide. In this case, the vessels 42 and 43 are heated one after another In the foregoing embodiment germanium, and cadmium sulfide and cadmium selenide were used in the ratio by weight of (1):(2 to 50):(30 to 200), and the resultant film had a thickness of 10 to 50 microns. The ratio of (1):(1 to 80):(20 to 400) produced a film about 5 to 100 microns thick which still gave good results.

Where silicon was substituted for germanium, the ratio of Si:CdS:CdSe =(1):(30 to 600):(20 to 200) produced a good film about 5 to 100 microns thick. In this case, the best condition was attained when silicon, cadmium sulfide and cadmium selenide were used at the rate of 1.2 mg., 155 mg. and 17 mg. respectively, or in the ratio of 1:130:14, forming a film 30 to 40 microns thick.

Figure 6D:
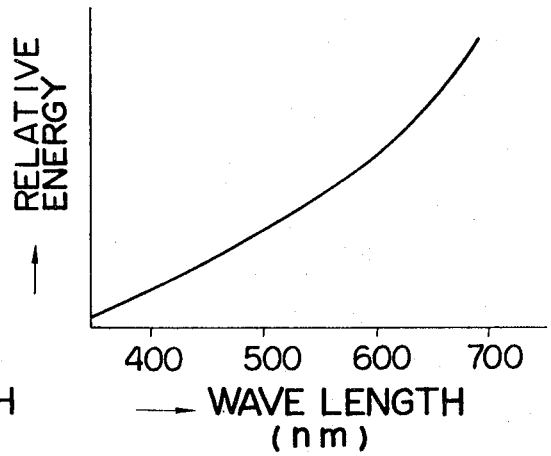

FIG. 6A represents the relative-energy distribution of light beams projected by a sealed beam fog lamp (12.8 v., 35 w.) using a lens coated with a color-rendering film prepared in the aforementioned manner from germanium, cadmium sulfide and cadmium selenide or silicon, cadmium sulfide and cadmium selenide. FIG. 6D shows the relative-energy distribution of light beams transmitting a lamp whose lens is not coated with a color-rendering film according to the present invention, and FIGS. 6B and 6C represent said distribution when the lens of an electric lamp is coated with a color-rendering film prepared from cadmium sulfide and cadmium selenide. Where relatively large proportions of cadmium selenide are used in the last mentioned case, the distribution may be represented by a curve as shown in FIG. 6C.

If the relative energies of light beams associated with FIGS. 6A, 6B and 6C are expressed in accordance with the CIE standard chromaticity diagram, they will present curves as shown in FIG. 7. The rhomboidal hatching R of FIG. 7 denotes the range of the SAE specification. As will be seen from FIG. 7, the chromaticity A of the relative energy as shown in FIG. 6A falls within the range of the SAE specification, whereas the chromaticities B and C the curves of FIGS. 6B and 6C are only located somewhere on a straight line connecting B and C, namely, outside of said range, no matter how the proportions of cadmium sulfide and cadmium selenide are varied.

The present invention permits the use of not only germanium but also other elements including silicon or compounds thereof having a spectrotransmitting property which may be indicated by a curve gently rising toward the long wave region. In case silicon is used, the curve representing said transmission starts rising at a point closer to the short wave region than when germanium is employed. However, there are still obtained the same results as in the case of germanium.

As mentioned above the present invention is a colored lamp whose lens, for example, is coated with a color-rendering film consisting of cadmium sulfide, cadmium selenide and other inorganic materials having a spectral light transmissible property which may be represented by a curve gently rising toward the long wave region, so that the lamp is operable under a very stable condition and free from any noticeable variations in the chromaticity of radiated light beams. Moreover, the color-rendering film has an extremely strong bonding power to an object, for example, a lens on which it is vacuum deposited and fully prevented from coming off therefrom. Further, the colored lamp of the present invention can be fabricated very easily without the necessity of using any special apparatus and consequently at low cost. Since one of the vacuum-deposited materials, which has a spectral light-transmissible property represented by a curve gently rising toward the long wave region, can be freely used either simultaneously with or separately from other vacuum-deposited materials or cadmium sulfide and cadmium selenide, the manufacturing method is very simple and has the advantage that there can be selected a most suitable process for external conditions.

When applied in an automobile, the present invention has the advantage of easily providing a fog lamp radiating spectral light beams having such distribution of relative energies as exactly agrees with the desired SAE specification.

The present invention is not limited to a sealed beam fog lamp according to an embodiment thereof. It will be apparent that the invention may be broadly applied in forming a color-rendering film 25, as shown in FIGS. 8A to 8D, in a decorative lamp (FIG. 8A), general incandescent lamp (FIG. 8B), midget automobile lamp (FIG 8C) or on the inner or outer surface of a filter (FIG. 8D) in conjunction with a separate light source. Throughout FIGS. 8A to 8D, numeral 51 denotes an envelope, for example, a glass bulb, 52 a mouthpiece, and 53 a light source member. Further the present invention is applicable not only to electric lamps but also to various light sources for illumination.

What we claim is:

1. A fog lamp comprising an envelope having a light-transmissible part, a light source positioned in the envelope and a color-rendering film vacuum deposited on the inner surface of the light-transmissible part of the envelope, said film consisting of cadmium sulfide, cadmium selenide and germanium whose ratio by weight is (1 to 80):(20 to 400):(1).

2. A fog lamp comprising an envelope having a light-transmissible part, a light source positioned in the envelope and a color-rendering film vacuum deposited on the inner surface of the light-transmissible part of the envelope, said film consisting of cadmium sulfide, cadmium selenide and silicon whose ratio by weight is (30 to 600):(2 to 200):(1).

3. A sealed beam fog lamp comprising a cup-shaped envelope made of hard glass and having an opening at one end, a lens fused to the opening to close up said opening, a reflective layer deposited on the inner circumferential surface of the envelope, a filament received in the envelope and a color-rendering film 5 to 100 microns thick vacuum deposited on the inner surface of the lens, said color-rendering film consisting of cadmium sulfide, cadmium selenide and germanium whose ratio by weight is (1 to 80):(20 to 400):(1).

4. A sealed beam fog lamp comprising a cup-shaped envelope made of hard glass and having an opening at one end, a lens fused to the opening to close up said opening, a reflective layer deposited on the inner circumferential surface of the envelope, a filament received in the envelope, and a color-rendering film 5 to 100 microns thick vacuum deposited on the inner surface of the lens, said color-rendering film consisting of cadmium sulfide, cadmium selenide and silicon whose ratio by weight is (30 to 600):(2 to 200):(1).

* * * * *